Sept. 3, 1935.  H. B. FALK  2,013,205
ELECTRIC COOKING DEVICE
Filed Jan. 18, 1933
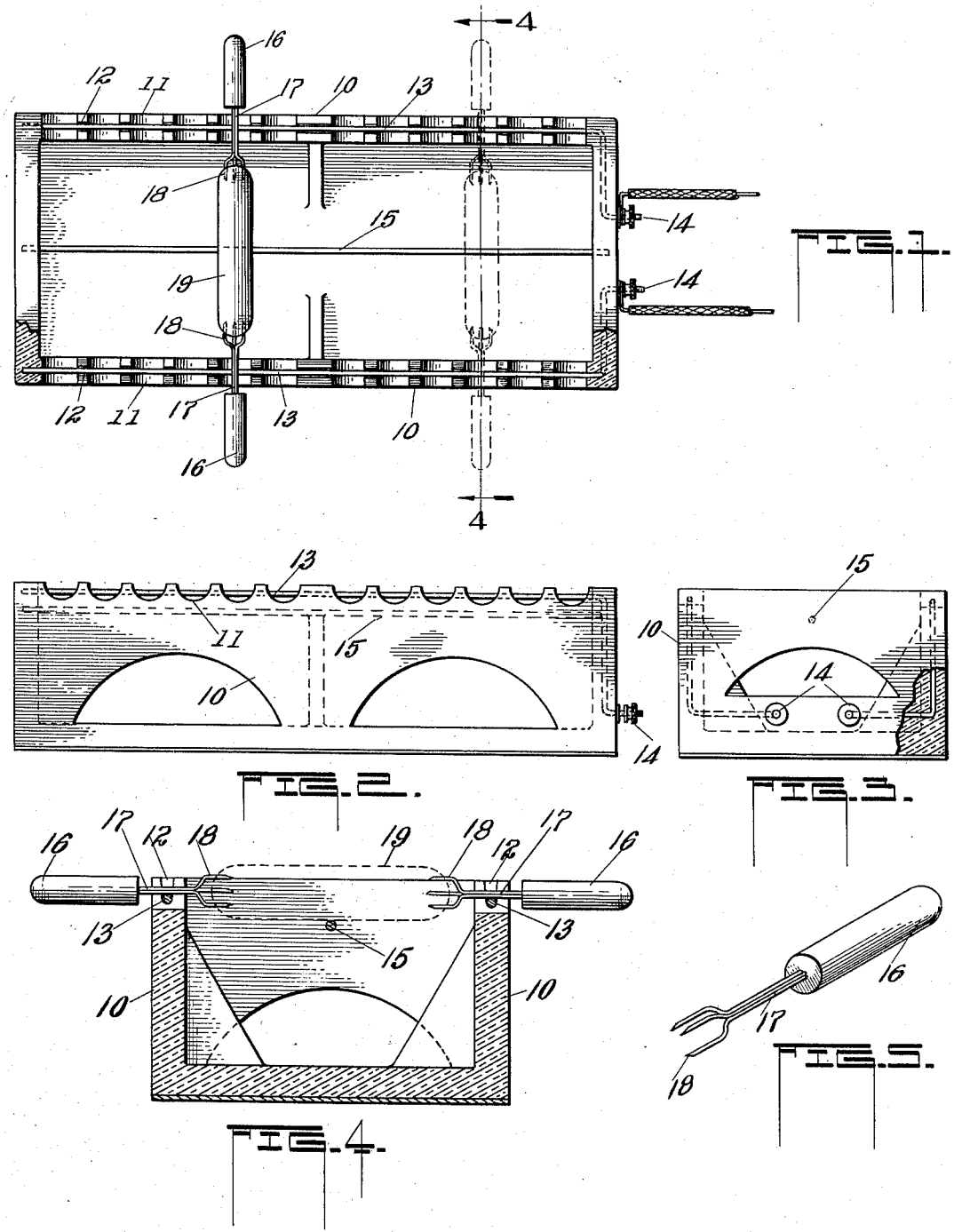
INVENTOR
Harry B. Falk
BY
Jefft & Jefft
ATTY'S Patented Sept. 3, 1935

2,013,205

UNITED STATES PATENT OFFICE 2,013,205

ELECTRIC COOKING DEVICE

Harry B. Falk, Peoria, Ill., assignor to Le Roy Cullom Smallenberger, Peoria, Ill.

Application January 18, 1933, Serial No. 652,305

2 Claims. (Cl. 219—19)

The present invention relates to electric food heaters or cookers.

An object of the invention is to provide a food heater which is adapted to heat food by means of the passage of an electric current therethrough.

Another object is to provide a food heater which utilizes the electrical conductivity of food or moisture contained therein for the purpose of passing the current by which said food is heated.

Still another object is to provide a means whereby food may be heated in a rapid and sanitary manner.

A further object is to provide a food heater having separate electrodes adapted to be inserted in an article of food and thereafter placed in contact with current carrying conductors for the purpose of completing an electric circuit between the said conductors.

Other objects will appear in the following description and accompanying drawing, in which Fig. 1 is a plan view of the heater showing a food article placed in position for heating;

Fig. 2 is a side elevational view of the heater;

Fig. 3 is an end elevational view of the same;

Fig. 4 is a sectional view taken from line 4—4 in Fig. 1; and

Fig. 5 is a perspective view of an electrode to be described.

Before proceeding with the description of my invention, it may be in order to say that the present drawing and description covers only one of many possible forms of food heater in which the principle of my invention may be used. The presently described form is shown for purposes of illustration only.

This food heating device is composed of two separate parts, a body member and co-acting electrodes.

Figs. 1 and 2 will disclose the body member 10, preferably made from vitreous material, having a bottom and upstanding side and end portions as shown.

Along the upper edge of the side portions of body 10 is a plurality of indents 11. Longitudinally of indents 11 are continuing grooves 12 in each of which is secured a conductor bar 13, the arrangement forming a plurality of exposed portions of conductors 13, as shown.

Bars 13 are preferably embedded in body 10 at one end and threaded in suitable openings in the opposite end to terminate at suitable binding posts as 14, whereby the bars may be connected to an electric light circuit.

Disposed in the upper central part of body 10 and positioned lengthwise thereof is a supporting bar member 15 having its ends secured in the end portions of body 10, as shown.

Fig. 5 will illustrate an electrode device comprising a handle 16, made from insulating material, in which is secured a metallic shank member 17, the outer end of which is formed into a plurality of prongs 18 as shown.

Operation

To heat a food article such as a sausage, an electrode is attached to either end thereof, by inserting the pronged portions into the ends of the sausage as shown in Fig. 1. The sausage and electrode assembly, or a plurality thereof, is then placed upon bars 13, with the shank portion of each electrode in electrical contact with exposed portions of bars 13, as shown at 19 in Figs. 1 and 4.

Bar 15 serves to support the central portion of the suspended sausage.

Conductivity of moisture in the sausage permits current to pass therethrough, from one of bars 13 to the other, the sausage forming a resistance circuit which permits passage of sufficient current to heat the sausage.

Obviously, any food item having suitable conductivity may be heated in this manner. My heater may therefore be made in many forms, without departing from the principle of my invention.

What I claim is:

1. A heating device having in combination dual conductors spaced apart in approximately parallel relation, supporting means therefor, means for supporting an article upon said conductors in electrical contact therewith, comprising dual separate detached metallic members adapted to be inserted in the article to form trunnion-like appendages thereupon, the latter adapted to be placed upon said parallel conductors to suspend the article between them whereby said metallic members provide mechanical support for the article together with means for conducting current from said conductors through the article.

2. A heating device having in combination dual conductors spaced apart in approximately parallel relation, supporting means therefor, means for supporting an article upon said conductors in electrical contact therewith comprising dual separate detached members each having a metallic portion and an insulated handle portion, the metallic portions adapted to be inserted in the article to form trunnion-like appendages thereupon, the latter adapted to be placed upon said parallel conductors to suspend the article between them whereby the metallic portions provide mechanical support for the article together with means for conducting current from said conductors through the article, said insulated portions providing means whereby the article may be manipulated without contact of the hands with heated or electrically charged surfaces.

HARRY B. FALK.